(12) United States Patent
Olson

(10) Patent No.: US 7,250,769 B1
(45) Date of Patent: Jul. 31, 2007

(54) METHODS AND APPARATUS FOR DETECTING LEAKS IN FLUORESCENT LAMPS

(75) Inventor: Scot Olson, Scottsdale, AZ (US)

(73) Assignee: Honeywell International, Inc., Morristown, NJ (US)

(*) Notice: Subject to any disclaimer, the term of this patent is extended or adjusted under 35 U.S.C. 154(b) by 73 days.

(21) Appl. No.: 11/350,539

(22) Filed: Feb. 9, 2006

(51) Int. Cl.
    *G01R 31/00* (2006.01)
(52) U.S. Cl. .................................. 324/414
(58) Field of Classification Search ........... 324/414
    See application file for complete search history.

(56) References Cited

U.S. PATENT DOCUMENTS 3,967,191 A * 6/1976 Roche ........................ 324/414

6,682,381 B1 * 1/2004 Michael ........................ 445/3

* cited by examiner

*Primary Examiner*—Vincent Q. Nguyen
(74) *Attorney, Agent, or Firm*—Ingrassia Fisher & Lorenz

(57) ABSTRACT

Methods and apparatus are provided for identifying the presence of leaks in a fluorescent bulb or other lamp suitable for use as a backlight in an avionics or other liquid crystal display (LCD). The lamp is first placed in a bath of helium or another vaporous substance having relatively small molecular size. The vaporous material is allowed to permeate through any leaks that may exist in the lamp and to thereby intermix with the light-producing vaporous material contained within the channel of the lamp. The lamp is removed from the bath and subsequently operated (e.g. at a low intensity), and the output electrical or optical characteristics of the lamp under test are obtained. If the output characteristics of the lamp under test substantially correspond to characteristics obtained from a lamp that is known to be in proper working order, then the absence of leaks in the lamp under test can be presumed.

6 Claims, 2 Drawing Sheets

METHODS AND APPARATUS FOR DETECTING LEAKS IN FLUORESCENT LAMPS

TECHNICAL FIELD

The present invention generally relates to fluorescent lamps, and more particularly relates to techniques and structures for improving the life and/or efficiency of fluorescent lamps such as those used in liquid crystal displays.

BACKGROUND

A fluorescent lamp is any light source in which a fluorescent material transforms ultraviolet or other shorter wavelength energy into visible light. Typically, a fluorescent lamp includes a glass tube that is filled with argon or other inert gas, along with mercury vapor or the like. When an electrical current is provided to the contents of the tube, the resulting arc causes the mercury gas within the tube to emit ultraviolet radiation, which in turn excites phosphors coating the inside lamp wall to produce visible light. Fluorescent lamps have provided lighting for numerous home, business and industrial settings for many years.

More recently, fluorescent lamps have been used as backlights in liquid crystal displays such as those used in computer displays, cockpit avionics, and the like. Such displays typically include any number of pixels arrayed in front of a relatively flat fluorescent light source. By controlling the light passing from the backlight through each pixel, color or monochrome images can be produced in a manner that is relatively efficient in terms of physical space and electrical power consumption. Despite the widespread adoption of displays and other products that incorporate fluorescent light sources, however, designers continually aspire to improve the amount of light produced by the light source, to extend the life of the light source, and/or to otherwise enhance the performance of the light source, as well as the overall performance of the display.

Accordingly, it is desirable to provide a fluorescent lamp and associated methods of building and/or operating the lamp that improve the performance and lifespan of the lamp. Other desirable features and characteristics will become apparent from the subsequent detailed description of the invention and the appended claims, taken in conjunction with the accompanying drawings and this background of the invention.

BRIEF SUMMARY

In various embodiments, methods are provided for identifying the presence of leaks in a fluorescent bulb or other lamp suitable for use as a backlight in an avionics or other liquid crystal display (LCD). The lamp is first placed in a bath of helium or another vaporous substance having relatively small molecular size. The vaporous material is allowed to permeate through any leaks that may exist in the lamp and to thereby intermix with the light-producing vaporous material contained within the channel of the lamp. The lamp is removed from the bath and subsequently operated (e.g. at a low intensity), and the output electrical or optical characteristics of the lamp under test are obtained. If the output characteristics of the lamp under test substantially correspond to characteristics obtained from a lamp that is known to be in proper working order, then the absence of leaks in the lamp under test can be presumed.

Other embodiments include lamps or displays incorporating techniques described herein. Additional detail about various exemplary embodiments is set forth below.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
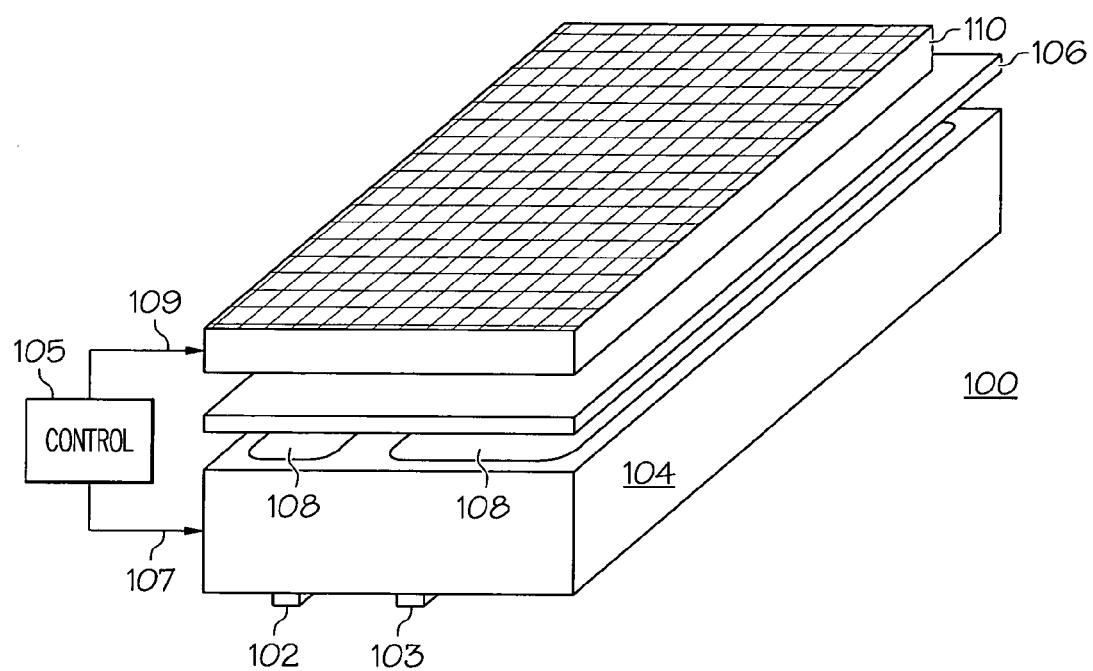
FIG. 1 is an exploded perspective view of an exemplary flat panel display.

Turning now to the drawing figures and with initial reference to FIG. 1, an exemplary flat panel display 100 suitably includes a backlight assembly with a substrate 104 and a faceplate 106 confining appropriate materials for producing visible light within one or more channels 108. Typically, materials present within channel(s) 108 include argon (or another relatively inert gas), mercury and/or the like. To operate the lamp, an electrical potential is created across the channel 108 (e.g. by coupling electrodes 102, 103 to suitable voltage sources and/or driver circuitry), the gaseous mercury is excited to a higher energy state, resulting in the release of a photon that typically has a wavelength in the ultraviolet light range. This ultraviolet light, in turn, provides "pump" energy to phosphor compounds and/or other light-emitting materials located in the channel to produce light in the visible spectrum that propagates outwardly through faceplate 106 toward pixel array 110.

The light that is produced by backlight assembly 104/106 is appropriately blocked or passed through each of the various pixels of array 110 to produce desired imagery on the display 100. Conventionally, display 100 includes two polarizing plates or films, each located on opposite sides of pixel array 110, with axes of polarization that are twisted at an angle of approximately ninety degrees from each other. As light passes from the backlight through the first polarization layer, it takes on a polarization that would ordinarily be blocked by the opposing film. Each liquid crystal, however, is capable of adjusting the polarization of the light passing through the pixel in response to an applied electrical potential. By controlling the electrical voltages applied to each pixel, then, the polarization of the light passing through the pixel can be "twisted" to align with the second polarization layer, thereby allowing for control over the amounts and locations of light passing from backlight assembly 104/106 through pixel array 110. Most displays 100 incorporate control electronics 105 to activate, deactivate and/or adjust the electrical parameters 109 applied to each pixel. Control electronics 105 may also provide control signals 107 to activate, deactivate or otherwise control the backlight of the display. The backlight may be controlled, for example, by a switched connection between electrodes 102, 103 and appropriate power sources. While the particular operating scheme and layout shown in FIG. 1 may be modified significantly in some embodiments, the basic principals of fluorescent backlighting are applied in many types of flat panel displays 100, including those suitable for use in avionics, desktop or portable computing, audio/video entertainment and/or many other applications.

Fluorescent lamp assembly 104/106 may be formed from any suitable materials and may be assembled in any manner. Substrate 104, for example, is any material capable of at least partially confining the light-producing materials present within channel 108. In various embodiments, substrate 104 is formed from ceramic, plastic, glass and/or the like. The general shape of substrate 104 may be fashioned using conventional techniques, including sawing, routing, molding and/or the like. Further, and as described more fully below, channel 108 may be formed and/or refined within substrate 104 by sandblasting in some embodiments.

Channel 108 is any cavity, indentation or other space formed within or around substrate 104 that allows for partial or entire confinement of light-producing materials. In various embodiments, lamp assembly 104/108 may be fashioned with any number of channels, each of which may be laid out in any manner. Serpentine patterns, for example, have been widely adopted to maximize the surface area of substrate 104 used to produce useful light. U.S. Pat. No. 6,876,139, for example, provides several examples of relatively complicated serpentine patterns for channel 108, although other patterns that are more or less elaborate could be adopted in many alternate embodiments.

Channel 108 is appropriately formed in substrate 104 by milling, molding or the like, and light-emitting material is applied though spraying or any other conventional technique. Light-emitting material found within channel 108 is typically a phosphorescent compound capable of producing visible light in response to "pump" energy (e.g. ultraviolet light) emitted by vaporous materials confined within channel 108. Various phosphors used in fluorescent lamps include any presently known or subsequently developed light-emitting materials, which may be individually or collectively employed in a wide array of alternate embodiments. Light emitting materials may be applied or otherwise formed in channel 108 using any technique, such as conventional spraying or the like. In various embodiments, an optional protective layer may be provided to prevent argon, mercury or other vapor molecules from diffusing into the light-emitting material. When used, such a protective layer may be made up of any conventional coating material such as aluminum oxide or the like. Alternatively, various embodiments could include a protective layer that includes fused silica ("quartz glass") or a similar material to prevent mercury penetration.

Cover 106 is typically made of glass, ceramic glass or plastic, and is suitably attached to substrate 104 by glass fritting or the like in a manner that seals the vaporous materials within channel 108.

Figure 2:
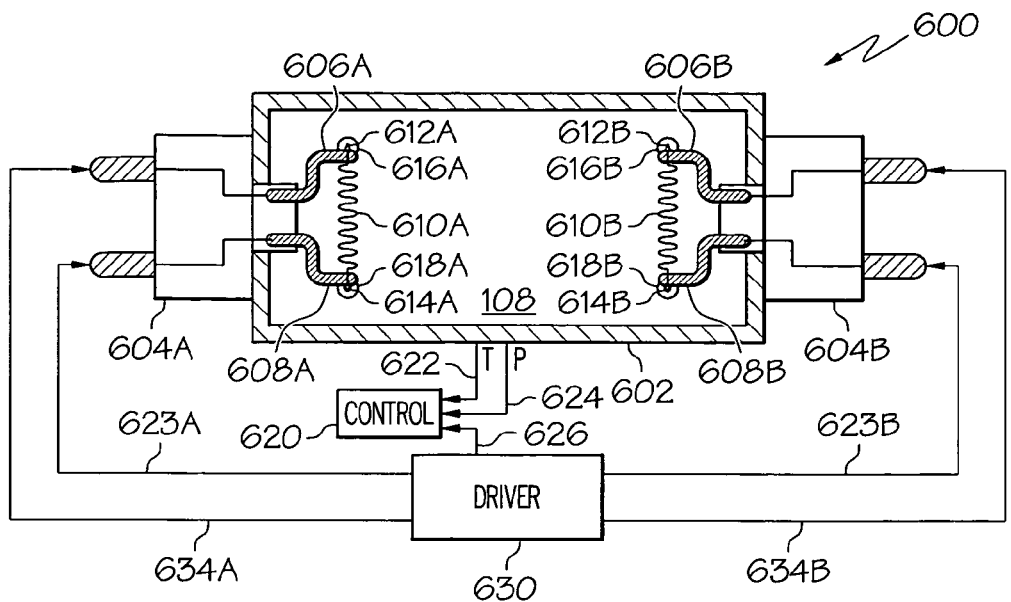
FIG. 2 is a block diagram that shows additional detail of an exemplary fluorescent bulb and the control electronics of an exemplary fluorescent lamp.

Turning now to FIG. 2, an exemplary light source system 600 suitably includes a fluorescent lamp 602, a driver circuit 630, and optional control circuitry 620. In various embodiments, control circuitry 620 senses and/or controls the temperature, pressure and/or other characteristics of lamp 602, and further provides one or more control signals 626 to driver circuit 630 to produce desired operation of system 600. Driver circuit 630 is typically implemented using any conventional analog and/or digital circuitry to apply any number of control signals 632A–B, 634A–B to produce light in lamp 602. In various embodiments, driver circuit 630 and control circuitry 620 are incorporated within a single device or circuit, and may be further combined with control electronics 105 for display 100 as described above.

Lamp 602 is any bulb or other light source capable of producing fluorescent light resulting from electrical excitation of vaporous materials residing within channel 108, as described above. In various embodiments, lamp 602 suitably includes two or more electrode assemblies 604A–B that provide an interface between external sources of electrical energy and the gas or plasma residing within channel 108. In a conventional implementation, electrode assemblies 604A–B each include two or more electrodes 612A–B, 614A–B interconnected by one or more filaments 610A–B. In the exemplary embodiment of FIG. 6, for example, one assembly 604A includes two electrodes 606A and 608A interconnected by filament 610A, and the other assembly 604B includes electrodes 606A and 608B interconnected by filament 610B. Driver circuit 630 provides appropriate electrical signals 632A–B, 634A–B that can be applied to electrodes 606A–B, 608A–B (respectively) to produce light. In a conventional embodiment, an alternating current is applied across each filament 610A–B, while a voltage difference is applied across channel 108 (e.g. a difference in charge is created between filament 610 and filament 610B) to allow electrons to migrate across the charged plasma within channel 108 from one end to the other. Signals 632A–B and 634A–B may be generated and applied in any manner to implement a wide array of equivalent operating techniques.

As a general matter, fluorescent lamps (and especially flat fluorescent lamps) can be susceptible to very small leaks (e.g. so-called "micro-leaks") that form in substrate 104, in cover 106, in the glass forming a fluorescent bulb, or in any other surface that encloses chamber 108. Although such leaks typically form during the manufacturing process, the very small size of such leaks prevents convenient detection. As a result, the lamp 100 may operate for hours, days, weeks or more until the leak becomes manifest, and the degradation of the lamp becomes apparent.

Figure 3:
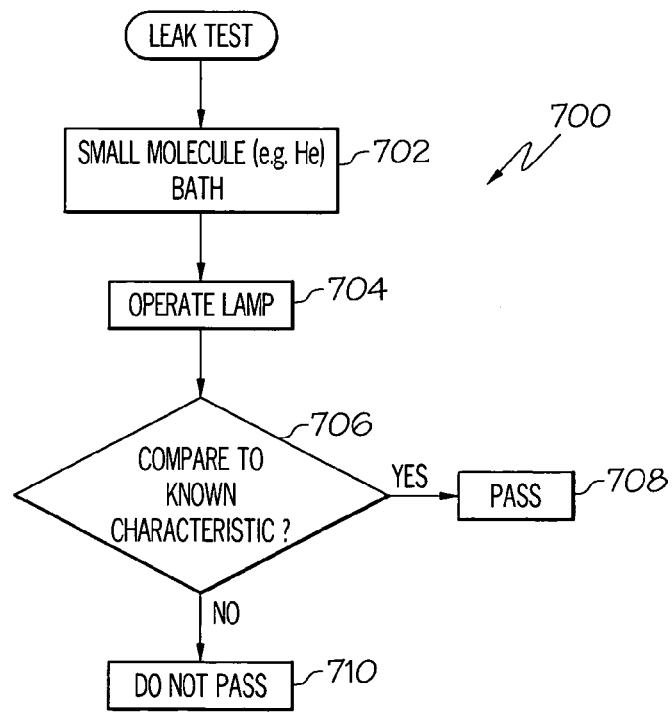
FIG. 3 is a flowchart of an exemplary technique for testing fluorescent bulbs prior to use.

Using the technique summarized in FIG. 3, however, even very small leaks can be readily detected. With reference now to FIG. 3, an exemplary process 700 for testing leaks in a fluorescent lamp suitably includes the broad steps of placing the lamp in a bath of helium gas or another similarly-sized molecule (step 702), subsequently operating the lamp (step 704) and comparing the operating characteristics of the lamp with those of a lamp that is known to be substantially leak-free (step 706). If the operating characteristics are similar, the lamp under test can assumed to be similarly leak free (step 708). Conversely, if the operating characteristics differ, the lamp under test will not pass the evaluation (step 710). Because helium (or similarly-sized) molecules are relatively small, such molecules readily permeate through micro-leaks in the lamp under test. Further, the presence of a foreign species such as helium within channel 108 will affect the electrical characteristics of driver circuitry 630, the optical characteristics of emitted light, and/or other operating parameters of the tested lamp as appropriate. By comparing the operating parameters of a lamp under test with the parameters of a lamp that is known to be operational, then, differences in operating parameters can reflect the presence of the foreign species within channel 108. As a result, if a lamp under test produces results that differ from those of a known good lamp, the contaminating substance can be assumed to be present within the lamp, thereby indicating the presence of one or more leaks. If a lamp is immersed in a helium bath, for example, and then connected to an arc driver circuit (e.g. driver circuit 630 in FIG. 2) or the like, the lamp can be driven at any level (e.g. at a relatively low luminance), and resulting voltage waveforms can be compared with those of a known good lamp, with differences indicating the presence of leaks that allowed the mercury to permeate into channel 108.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims and their legal equivalents.

What is claimed is:

1. A method for identifying leaks in a fluorescent lamp under test, the method comprising the steps of:
    placing the lamp under test in a bath of permeating material;
    subsequently operating the lamp under test;
    comparing an output characteristic of the lamp under test with a known characteristic to thereby detect the presence of the permeating material within the lamp under test; and
    accepting the fluorescent lamp if the output characteristic of the lamp under test substantially conforms to the known characteristic, and otherwise determining that a leak exists in the fluorescent lamp under test.

2. The method of claim 1 wherein the permeating material comprises helium.

3. The method of claim 1 wherein the output characteristic is an electrical characteristic.

4. The method of claim 1 wherein the output characteristic is an optical characteristic.

5. The method of claim 1 wherein the operating step comprises coupling the lamp under test to a driver circuit.

6. A method for identifying leaks in a fluorescent lamp under test, the method comprising the steps of:
    placing the lamp under test in a bath of vaporous helium;
    subsequently operating the lamp under test;
    comparing an output electrical characteristic of the lamp under test with a known electrical characteristic to thereby detect the presence of the permeating material within the lamp under test; and
    accepting the fluorescent lamp if the output characteristic of the lamp under test substantially conforms to the known characteristic, and otherwise determining that a leak exists in the fluorescent lamp under test.

* * * * *